United States Patent [19]

Suumen

[11] Patent Number: 5,458,475

[45] Date of Patent: Oct. 17, 1995

[54] SCREW OF INJECTION MOLDING MACHINE

[75] Inventor: Hiroyoshi Suumen, Chiba, Japan

[73] Assignee: Sumitomo Heavy Industries, Ltd., Tokyo, Japan

[21] Appl. No.: 792,858

[22] Filed: Nov. 20, 1991

[30] Foreign Application Priority Data

Nov. 22, 1990 [JP] Japan .................................. 2-121806 U

[51] Int. Cl.⁶ .................................................. B29C 45/60
[52] U.S. Cl. ............................ 425/208; 366/79; 425/550; 425/587; 264/349
[58] Field of Search ................................. 425/207, 208, 425/209, 550, 587; 264/349; 366/79, 88, 318, 320, 323

[56] References Cited

U.S. PATENT DOCUMENTS

| | | | |
|---|---|---|---|
| 3,023,456 | 3/1962 | Palfey | 425/208 |
| 3,169,275 | 2/1965 | Compton et al. | 425/208 |
| 3,266,097 | 8/1966 | Larsen | 425/208 |
| 3,843,290 | 10/1974 | Sender | 425/208 |
| 4,185,060 | 1/1980 | Ladney, Jr. | 425/208 |

FOREIGN PATENT DOCUMENTS 1238496  11/1968  Germany .

Primary Examiner—James P. Mackey
Attorney, Agent, or Firm—Nikaido, Marmelstein, Murray & Oram

[57] ABSTRACT

A screw of a screw-in-line type plasticizing device of an injection molding machine has a cylindrical main part and a spiral screw flight on the main part. A portion of the screw flight of the screw facing a resin supply port has a parallelogrammic axial sectional shape which is inclined towards the discharge end of the screw.

2 Claims, 1 Drawing Sheet

SCREW OF INJECTION MOLDING MACHINE

BACKGROUND OF THE INVENTION

The present invention relates to a plasticizing device in an injection molding machine and, more particularly, to an in-line type screw of the plasticizing device.

FIG. 3 schematically shows a conventional screw 11, in particular the portion around a resin supply port 13.

The operation of the conventional in-line screw 11 relies upon frictional force alone so that it could never stably plasticize the material. In particular, platicization is often rendered unstable when a lubricating oil is mixed in the resin material for the purpose of improving lubrication of the molded product.

Unstable plasticization is caused when the resin material 4 cannot smoothly be fed forward due to clinging of the resin on the screw 11. This problem takes place when the friction between the resin 4 and the surface 11b of the screw 11 is not substantially different from the friction between the resin 4 and the inner surface 12a of the cylinder.

Good plasticizing effect is obtained when the friction between the resin 4 and the inner surface 12a of the cylinder is considerably higher than that between the resin 4 and the screw surface 11b. In order to realize this condition, attempts have been made such as roughening of the inner surface 12a of the cylinder and provision of axial grooves in the inner surface 12a of the cylinder.

These attempts such as roughening or grooving of the cylinder inner surface 12a cause problems such as an increase in the driving torque for driving the screw 11 or imperfect plasticization particularly when the speed of the screw is increased.

Thus, no reliable method for stabilizing plasticization of resin has been proposed.

Accordingly, an object of the present invention is to provide an improved screw for injection molding which can overcome the above-described problems of the prior art.

To this end, according to the present invention, there is provided a screw of a screw-in-line type plasticizing device, characterized in that a portion of a screw flight facing a resin supply port has a parallelogrammic axial section which is inclined towards the discharge end of the screw.

DESCRIPTION OF THE PREFERRED EMBODIMENTS

Figure 2:
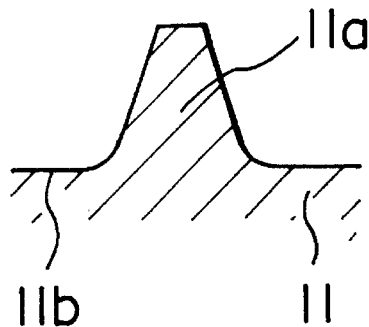
FIG. 2 is a sectional view of a critical portion of a known screw.
Figure 3:
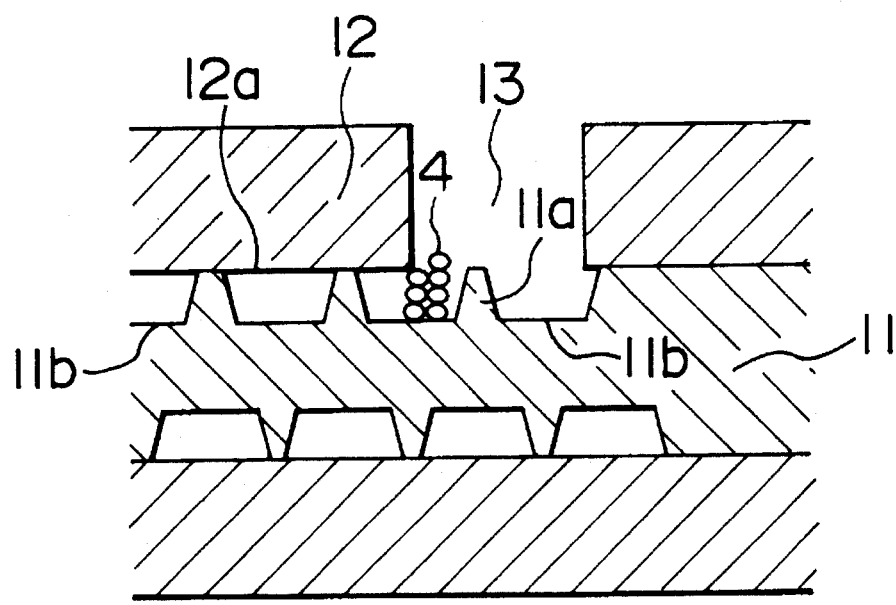
FIG. 3 is a sectional view of a portion of a plasticizing device which incorporates the screw shown in FIG. 2.

FIG. 2 shows a screw flight of screw in the conventional in-line type plasticizing device described before in connection with FIG. 3. The flight 11a has a trapezoidal cross-section, so that the resin pellets 4 supplied through the supply port 13 are lifted by the flank of the flight 11a so as to be displaced radially outward. Consequently, plasticizing effect has large dependency on the friction between the resin pellets 4 and the inner surface 12a of the cylinder.

Figure 1:
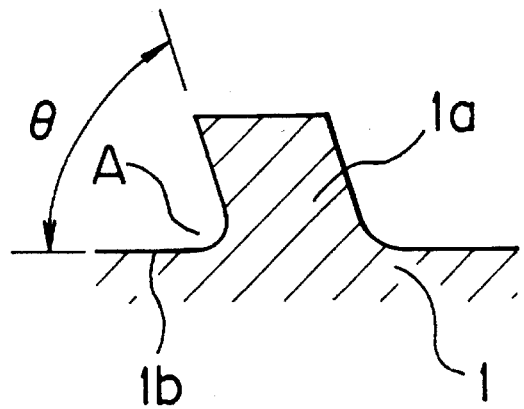
FIG. 1 is a sectional view of a critical portion of the screw in accordance with the present invention.

FIG. 1 shows the sectional shape of the flight 1a of the screw in accordance with the present invention. As will be seen from this Figure, the screw flight 1a has a parallelogrammic sectional shape when taken along an axial plane, and this axial sectional shape is inclined towards the discharge end of the screw. Therefore, the resin pellets 4 which have been introduced into the space A are prevented by the inclined flank of the screw flight 1a from being displaced radially outward. Consequently, the resin pellets are advanced smoothly towards the discharge end in accordance with the rotation of the screw 1, thus ensuring high stability of plasticization.

The above-mentioned inclined parallelogrammic sectional shape is adopted only in the portion of the screw adjacent the resin supply port 13, in order to prevent stagnation of the resin pellets.

The screw 1 of the present invention can be produced by machining a single cylindrical blank so as to leave spiral flight 1a such that the angle $\theta$ of inclination is set to be 90° or smaller. Preferably, the portion of the screw flight having the inclined parallelogrammic sectional shape extends over a length which is substantially equal to the sum of the screw pitch and the axial length of the resin supply port.

The in-line type plasticizing device having the screw in accordance with the present invention can effectively plasticize and meter the resin even when the resin contains an oil, without being accompanied by troubles such as increase in the driving torque and imperfect plasticization. Furthermore, stagnation of the resin is avoided because the parallelogrammic inclined sectional shape is adopted only on a portion of the screw flight.

What is claimed is:

1. A plasticizing device of an injection molding machine, comprising:

a housing having a hollow interior bounded by a substantially cylindrical interior wall, and a resin supply port extending through said cylindrical interior wall of said housing in communication with said hollow interior;

a screw having a screw thread for plasticizing and driving resin pellets axially through said hollow interior of said housing, said screw thread extending in a generally radial direction toward said cylindrical interior wall, said screw thread having a first thread flight having a first type of thread cross-section and a second thread flight having a second type of thread cross-section, wherein said resin supply port extends a predetermined distance along an axial direction of said screw, and said first thread flight extends a distance equal to approximately said predetermined length of said resin supply port plus a distance equal to a pitch of said screw, and wherein a portion of said first thread flight of said screw extends adjacent said resin supply port, said first type of thread cross-section of said first thread flight has a thread cross-section which is shaped as a parallelogram, and said first type of thread is inclined as viewed in section toward a discharge end of said screw.

2. A plasticizing device as claimed in claim 1, wherein said second thread flight extends along said screw from said discharge end of said screw to said first thread flight.

* * * * *